(12) United States Patent
Lipke et al.

(10) Patent No.: US 7,775,573 B2
(45) Date of Patent: Aug. 17, 2010

(54) AUTOMATIC DEPLOYING HANDLE

(75) Inventors: Clarence P. Lipke, Fenton, MI (US);
Timothy F. O'Brien, White Lake, MI (US)

(73) Assignee: Magna International Inc., Aurora (CA)

( * ) Notice: Subject to any disclaimer, the term of this patent is extended or adjusted under 35 U.S.C. 154(b) by 606 days.

(21) Appl. No.: 11/744,474

(22) Filed: May 4, 2007

(65) Prior Publication Data

US 2007/0257499 A1 Nov. 8, 2007

Related U.S. Application Data

(60) Provisional application No. 60/746,405, filed on May 4, 2006.

(51) Int. Cl.
*B60R 13/02* (2006.01)
(52) U.S. Cl. ...................... 296/1.02; 296/214
(58) Field of Classification Search ............... 296/1.02, 296/146.7, 214, 1.08, 187.03; 16/110.1, 16/446
See application file for complete search history.

(56) References Cited

U.S. PATENT DOCUMENTS

| | | | |
|---|---|---|---|
| 6,431,643 B2 * | 8/2002 | Grey | 296/214 |
| 7,063,377 B2 * | 6/2006 | Brei et al. | 296/187.09 |
| 2004/0195815 A1 * | 10/2004 | Browne et al. | 280/753 |

* cited by examiner

*Primary Examiner*—Joseph D Pape
(74) *Attorney, Agent, or Firm*—Honigman Miller Schwartz and Cohn LLP

(57) ABSTRACT

A trim assembly is disclosed. The trim assembly includes a vehicular trim panel and a portion mounted to the vehicular trim panel that is movable between a stowed position and a deployed position relative the vehicular trim panel. The portion is defined to include a shape-changing polymer. The assembly also includes an energy transfer device that provides energy to the shape-changing polymer to cause movement of the portion between the stowed position and the deployed position. A method is also disclosed.

24 Claims, 2 Drawing Sheets

AUTOMATIC DEPLOYING HANDLE

RELATED APPLICATIONS

This application claims the benefit of earlier filed U.S. Provisional Application Ser. No. 60/746,405, filed May 4, 2006, which is incorporated herein by reference in its entirety.

TECHNICAL FIELD

The invention relates to an automatic deploying portion and to an automatic deploying handle for a vehicle.

BRIEF DESCRIPTION OF THE DRAWINGS

Embodiments of the invention will now be described, by way of example, with reference to the accompanying drawings, wherein.

DETAILED DESCRIPTION

Figure 1:
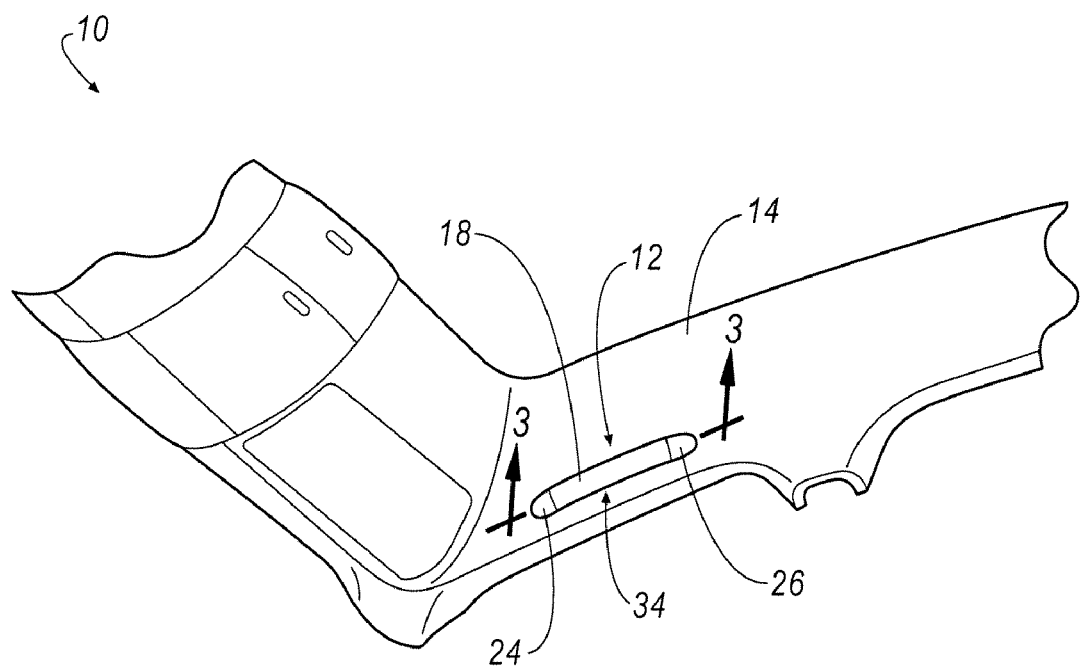
FIG. 1 is a perspective view of a vehicle having an automatic deploying handle in a stowed position and according to an embodiment of the invention.
Figure 2:
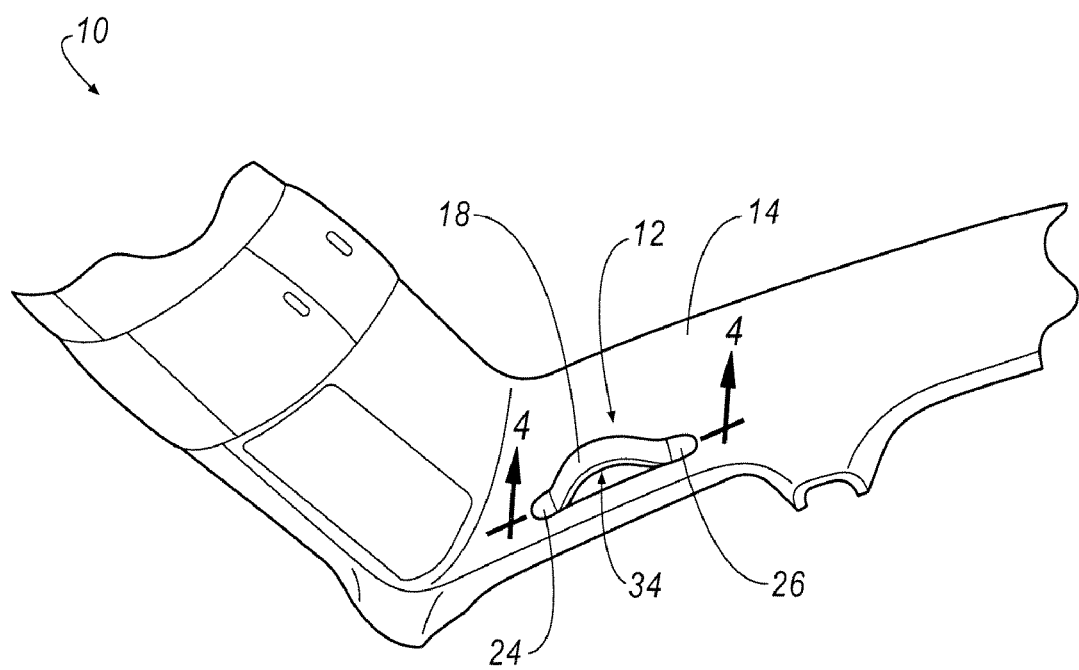
FIG. 2 is a perspective view of the vehicle having an automatic deploying handle from FIG. 1 in a deployed position and according to an embodiment of the invention.
Figure 3:
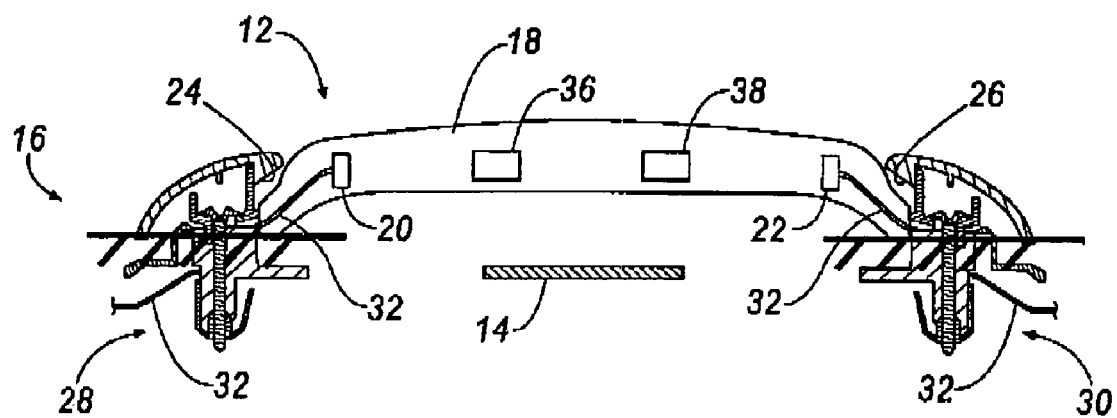
FIG. 3 is a cross-sectional view of the vehicle and handle taken substantially along lines 3-3 FIG. 1 according to an embodiment of the invention.
Figure 4:
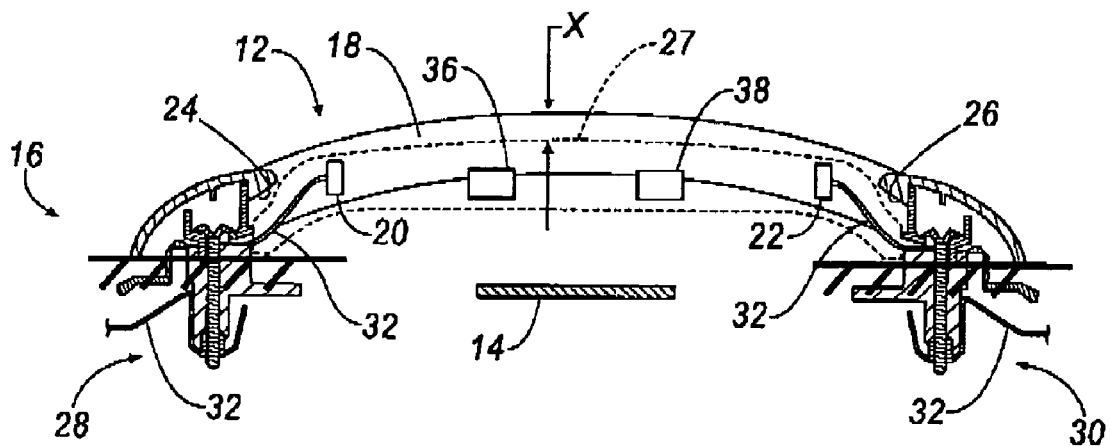
FIG. 4 is a cross-sectional view of the vehicle and handle taken substantially along lines 4-4 of FIG. 2 according to an embodiment of the invention.

FIG. 1 and FIG. 2 illustrates a vehicle 10 having an automatic, self-deploying portion 12 arranged in accordance with an exemplary embodiment of the invention. FIG. 1 and FIG. 3 illustrate the portion 12 in a stowed position and FIG. 2 and FIG. 4 illustrate the portion 12 in a deployed position.

In an embodiment, the portion 12 is deployably-arranged upon a vehicular panel 14. As illustrated and without limitation, vehicular panel 14 may be a vehicular headliner 16 or a panel that supports a headliner (e.g., a roof or roof portion of a vehicle). By this disclosure, it is recognized that the portion 12 may be, for example, a handle, which is commonly referred to in the art as a grab handle.

According to an embodiment, the handle 12 may be arranged on the interior, or, alternatively, on the exterior of the vehicle 10. Thus, it will be appreciated that although the vehicle panel 14 is illustrated, according to an embodiment, as an interior trim panel, the vehicle panel 14 may alternatively provide an exterior panel of the vehicle.

For example and without limitation, the portion 12 is not limited to a handle, and, may be provided in the alternative as a closure panel, such as, for example a door. In application, if the portion 12 is a door, the door may be arranged and function as a closure member for a compartment, such as, for example, a glove box, a storage container or the like.

For purposes of convenience, the portion 12 is referred to hereinafter as a handle 12. In addition, the vehicular panel 14 will be referenced herein as vehicular headliner 16. It is recognized that handle 12 and vehicular panel 14 shall be entitled to the broad spirit and scope of the foregoing examples such that the invention should not be so limited to the following exemplary embodiment and terminology.

With specific reference to FIGS. 3 and 4, in an embodiment, handle 12 includes a shape changing polymer 18 (e.g, a plastic composite that moves in response to electricity as described more fully below) and a pair of electrodes 20, 22 adapted to transfer energy within shape changing polymer 18 to excite shape changing polymer 18. Upon considering this disclosure, one of ordinary skill will discern various handle configurations to deploy and stow handle 12 based on the energy transfer through handle 12 and the properties of the shape changing polymeric material.

For example, while electrodes are disclosed, other mechanisms for providing the requisite excitement energy may be substituted therefore, and the present invention should not be limited to the exemplary disclosure. Moreover, in an embodiment, the shape changing polymer is an electrically actuated polymer (hereinafter "EAP"). For brevity, the exemplary embodiment of the present disclosure employs an electronic EAP (such as, for example, ferroelectric polymers, electrets, dielectric elastomers and electrostictive graft elastomers); however, based on this disclosure, it will be readily apparent to one of ordinary skill in the art that the principles hereof can be extended to and employed by ionic EAPs (such as, for example, ionic polymer gels, ionomeric poylmer-metal composites, conductive polymers and carbon nanotubes).

In an embodiment, the EAP is provided as the shape-changing polymer 18 to allow handle 12 to deploy and stow based on an electrical charge applied there-across. As described above, the electrical charge is generated between first and second electrodes 20, 22. By this arrangement, upon being exposed to an electric charge or a voltage drop across the shape-changing polymer 18 or EAP, the handle 12 expands. Upon expansion of the handle 12, the handle 12 becoming generally elongated such that the handle 12 may deploy to a use position, as illustrated, for example, in FIG. 2 and FIG. 4. Similarly, upon removal of the foregoing electric charge, the handle 12 contracts to thereby contract into a stowed position that is illustrated, for example, in FIG. 1 and FIG. 3.

Referring to all the figures, in an embodiment, handle 12 includes a first mount 24 and a second mount 26. With specific reference to FIGS. 3 and 4, in an embodiment, handle 12 is deployably-arranged on headliner 16 at a first junction 28 and a second junction 30 such that handle 12 is fixed at these junctions via first mount 24 and second mount 26. Fixing the handle 12 by first mount 24 and second mount 26 in the foregoing manner results in handle 12 extending outward when energized, as exemplarily illustrated in FIG. 2 and FIG. 4. For example, FIG. 4 illustrates a mid-point 27 of handle 12 displaced a distance, X, when moved from the stowed position to the deployed position.

In an embodiment, the electric charge is communicated to handle 12 between first electrode 20 and a second electrode 22. First and second electrodes 20, 22 are in electrical communication with an electrical power source (not shown). In an embodiment, first and second electrodes 20, 22 receive the requisite electrical power by way of current carrying conductors 32 concealed in the headliner 16. For example, an electrical interface could be built directly into headliner 16 such that headliner 16 conceals an electrical conductor 32 or, in the alternative, headliner 16 itself could function as the medium for conducting current to and from electrodes 20, 22. While the foregoing specific examples are provided to bring power to handle 12, the inventive handle 12 shall be entitled to the broad spirit and scope and should not be limited thereby.

Referring back to FIG. 1 and FIG. 2, in an embodiment, headliner 16 may further define a handle stowage area 34, such as, for example, a recess between first junction 20 and second junction 22. In an embodiment, when handle 12 is in the stowed position (i.e. not energized), as depicted in FIG. 1, a top or surface portion of handle 12 may become generally planar and flush with an outer or A-surface of the headliner 16. Accordingly, the handle 12 nests within and fills recess 34 such that surface portion of the handle 12 and the A-surface of the headliner 16 substantially define a headliner having a continuous, flush A-surface.

In an embodiment, handle 12 can be adapted to deploy in response to a predefined activity, occurrence or event. In an embodiment, a sensor 36 or the like is arranged in concert with handle 12 such that upon sensing a predefined condition (such as movement of an object, such as, for example, a user's hand, proximate to the handle 12), the handle 12 becomes energized, and therefore, moves from the stowed position to a deployed position.

As mentioned above, it will be appreciated that the vehicular panel 14 may be an exterior vehicle panel; as such, the handle 12 may be an exterior handle that permits a user to open and close a passenger compartment door 14. Accordingly, a sensor 36 may also be provided in, on, or proximate an exteriorly-mounted handle 12 such that the handle 12. In an embodiment, the handle 12 may be originally provided in a stowed, nested position to provide a "handless" appearance to the passenger compartment door; when a vehicle operator or passenger approaches the vehicle, the sensor 36 may detect the operator or passenger and thereby cause the handle 12 to be moved from the stowed position to a presented, deployed position.

While movement of the handle 12 has been exemplary discussed as a conditional, predefined situation such that sensing motion is a predefined activity, upon considering this disclosure, various other predefined activities and conditions may similarly be substituted, and therefore, such conditions or activities may be used alone or in combination therewith. For example, handle 12 may be made to deploy upon any number of predefined activities including, for example, sensing the movement of a passenger compartment door (i.e., the passenger compartment door is moved from a closed position to an open position). In another embodiment, the sensed condition or activity may be a predefined speed of the vehicle. In another embodiment, the sensed condition or activity may be a predefined or change in tire pressure, which may occur, for example, during a turn or cornering of a vehicle at a high speed thereby imparting a centrifugal force to the vehicle, occupants, or the like. Accordingly, a variety of sensors may be disposed throughout the vehicle that may sense a variety of activities or conditions other than movement of an object proximate the handle 12.

In an embodiment, a shape imparter 38 or the like may be arranged within the handle for imparting shape or the like. For example, shape imparter 38 could be a spring disposed within the handle 12 to generally impart a shape to handle 12 when energized and/or when de-energized. These and other shape imparting structures and technologies will become apparent to one of ordinary skill in the art upon considering this disclosure.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A trim assembly, comprising: a vehicular trim panel; a portion mounted to the vehicular trim panel that is movable between a stowed position and a deployed position relative the vehicular trim panel, wherein the portion is defined to include a shape-changing polymer; and an energy transfer device that provides energy to the shape-changing polymer to cause movement of said portion between said stowed position and said deployed position, wherein said vehicular trim panel is a headliner, wherein said portion is a handle that is mounted to the headliner by a first mount at a first junction, and a second mount at a second junction.

2. The trim assembly according to claim 1, wherein said energy transfer device includes a pair of electrodes, wherein said shape changing polymer includes a plastic composite that is responsive to electricity provided by the pair of electrodes to cause movement of said portion between said stowed position and said deployed position.

3. The trim assembly according to claim 2, wherein said plastic composite shape changing polymer is selected from the group consisting of ferroelectric polymers, electrets, dielectric elastomers, and electrostictive graft elastomers.

4. The trim assembly according to claim 2, wherein said plastic composite shape changing polymer is an ionic plastic composite shape changing polymer, wherein said ionic plastic composite shape changing polymer is selected from the group consisting of ionic polymer gels, ionomeric poylmer-metal composites, conductive polymers, and carbon nanotubes.

5. The trim assembly according to claim 1 further comprising current-carrying conductors disposed in the vehicular trim panel that provides energy to said energy transfer device.

6. The trim assembly according to claim 1, wherein the vehicular trim panel includes a recess corresponding to a contour of the portion for receiving the portion when the portion is moved to the stowed position, wherein, upon receipt of the portion in the recess, a surface of the portion is substantially planar with an A-surface of the vehicular trim panel to provide a flush surface appearance of said vehicular trim panel.

7. The trim assembly according to claim 1 further comprising a sensor that detects a pre-defined condition or activity, wherein, detection of said pre-defined condition or activity causes said energy transfer device to provide energy to said shape-changing polymer to cause movement of said portion between said stowed position and said deployed position.

8. The trim assembly according to claim 1 further comprising a shape-imparter arranged in said portion, wherein the shape-imparter includes a spring.

9. A trim assembly, comprising: a vehicular trim panel; a portion mounted to the vehicular trim panel that is movable between a stowed position and a deployed position relative the vehicular trim panel; and means for expanding and contracting the portion to move the portion between, respectively, said deployed position and said stowed position wherein said vehicular trim panel is a headliner, wherein said portion is a handle that is mounted to the headliner by a first mount at a first junction, and a second mount at a second junction.

10. The trim assembly according to claim 9, wherein said means for expanding and contracting the portion includes a shape-changing polymer that is in communication with an energy transfer device that provides energy to the shape-changing polymer, wherein the portion includes the shape-changing polymer.

11. The trim assembly according to claim 10, wherein said energy transfer device includes a pair of electrodes, wherein said shape changing polymer includes a plastic composite that is responsive to electricity provided by the pair of electrodes to cause movement of said portion between said stowed position and said deployed position.

12. The trim assembly according to claim 11, wherein said plastic composite shape changing polymer is selected from the group consisting of ferroelectric polymers, electrets, dielectric elastomers, and electrostictive graft elastomers.

13. The trim assembly according to claim 11, wherein said plastic composite shape changing polymer is an ionic plastic composite shape changing polymer, wherein said ionic plastic composite shape changing polymer is selected from the group consisting of ionic polymer gels, ionomeric poylmer-metal composites, conductive polymers, and carbon nanotubes.

14. The trim assembly according to claim 10 further comprising current-carrying conductors disposed in the vehicular trim panel that provides energy to said energy transfer device.

15. The trim assembly according to claim 9, wherein the vehicular trim panel includes a recess corresponding to a contour of the portion for receiving the portion when the portion is moved to the stowed position, wherein, upon receipt of the portion in the recess, a surface of the portion is substantially planar with an A-surface of the vehicular trim panel to provide a flush surface appearance of said vehicular trim panel.

16. The trim assembly according to claim 9 further comprising means for imparting expansion and contraction of said portion relative said vehicular trim panel.

17. The trim assembly according to claim 16, wherein said means for imparting expansion and contraction includes a sensor that detects a pre-defined condition or activity, wherein, detection of said condition or pre-defined activity causes said energy transfer device to provide energy to said shape-changing polymer to cause movement of said portion between said stowed position and said deployed position.

18. The trim assembly according to claim 9 further comprising a shape-imparter arranged in said portion, wherein the shape-imparter includes a spring.

19. A method for imparting movement to a component of a trim assembly, comprising the steps of: mounting a portion including a shape-changing polymer to a vehicular trim panel; and moving said portion between a stowed position and a deployed position, wherein movement of said portion to a stowed position is provided by contracting said shape-changing polymer, wherein movement of said portion to said deployed position is provided by expanding said shape-changing polymer, wherein movement between contracting and expanding movement of the portion is conditional anon sensing fined condition or activity, wherein the sensing step includes sensing that a passenger compartment door is moved from a closed position to an open position.

20. The method according to claim 19, wherein the contracting step includes ceasing a supply of energy from an energy transfer device to the shape-changing polymer, wherein the expanding step includes providing a supply of energy from an energy transfer device to the shape-changing polymer.

21. The method according to claim 19 further comprising the steps of moving said portion into a recess formed in the vehicular trim panel when the portion is moved to said stowed position; and providing a flush surface appearance of said vehicular trim panel.

22. The method according to claim 19, wherein the sensing step includes sensing movement of an object that is proximate the portion.

23. The method according to claim 19, wherein the sensing step includes sensing a turning motion of a vehicle.

24. The method according to claim 23, wherein the sensing of the turning motion of the vehicle includes sensing a change in tire pressure.

\* \* \* \* \*

UNITED STATES PATENT AND TRADEMARK OFFICE
CERTIFICATE OF CORRECTION

PATENT NO. : 7,775,573 B2  Page 1 of 1
APPLICATION NO. : 11/744474
DATED : August 17, 2010
INVENTOR(S) : Clarence P. Lipke et al.

It is certified that error appears in the above-identified patent and that said Letters Patent is hereby corrected as shown below:

In the Claims:

Please correct Claim 19 as follows:

Column 6, line 15, delete "anon" and insert -- upon -- and
Column 6, line 16, delete "fined" and insert -- a pre-defined --.

Signed and Sealed this

Fifth Day of October, 2010

David J. Kappos
*Director of the United States Patent and Trademark Office*